United States Patent

Rittmannsberger et al.

[11] Patent Number: 5,078,457
[45] Date of Patent: Jan. 7, 1992

[54] VACUUM MOTOR FOR VEHICLE BRAKE SYSTEMS

[75] Inventors: Norbert Rittmannsberger; Gerhard Wetzel, both of Stuttgart, Fed. Rep. of Germany

[73] Assignee: Robert Bosch GmbH, Stuttgart, Fed. Rep. of Germany

[21] Appl. No.: 559,522

[22] Filed: Jul. 24, 1990

Related U.S. Application Data

[63] Continuation of Ser. No. 343,319, Apr. 26, 1989, abandoned.

[30] Foreign Application Priority Data

Jun. 18, 1988 [DE] Fed. Rep. of Germany ....... 3820657

[51] Int. Cl.$^5$ ............................................. B60T 13/68
[52] U.S. Cl. ............................................. 303/113 TB
[58] Field of Search ............. 303/114, 96, 4, 12; 91/376 R, 369.1; 188/356, 357; 180/197

[56] References Cited

U.S. PATENT DOCUMENTS

| 3,433,536 | 3/1969 | Skinner | 303/114 |
|---|---|---|---|
| 3,556,608 | 1/1971 | MacDuff et al. | 303/114 |
| 3,559,532 | 2/1971 | MacDuff et al. | 303/114 |
| 3,617,099 | 11/1971 | Sugiyama | 303/96 |
| 4,576,004 | 3/1986 | Bach | 91/376 R X |
| 4,594,854 | 6/1986 | Takeuchi | 60/547 |
| 4,610,483 | 9/1986 | Matsumoto et al. | 303/114 |
| 4,630,706 | 12/1986 | Takayama et al. | 303/114 |
| 4,659,153 | 4/1987 | Klein | 303/114 |
| 4,708,401 | 11/1987 | Klein | 303/114 |
| 4,759,255 | 7/1988 | Shimamura | 91/6 |
| 4,778,225 | 10/1988 | Rudolph et al. | 303/114 |
| 4,828,337 | 5/1989 | Wagner et al. | 303/114 |

FOREIGN PATENT DOCUMENTS

| 0136689 | 4/1985 | European Pat. Off. | 91/376 R |
|---|---|---|---|
| 0173054 | 3/1986 | European Pat. Off. | |
| 3705333 | 8/1987 | Fed. Rep. of Germany | |
| 3638405 | 5/1988 | Fed. Rep. of Germany | 303/114 |

Primary Examiner—Matthew O. Graham
Attorney, Agent, or Firm—Edwin E. Greigg; Ronald E. Greigg

[57] ABSTRACT

A vacuum motor having a first chamber and a second chamber that in the actuation direction is disposed following a dividing movable wall, a third chamber is provided preceding the first chamber. Upon the occurrence of a traction control situation, the third chamber is moved into a connection between a magnetic assembly which is connected to atmospheric pressure and the first chamber. The second chamber is at the same time connected to a negative pressure source. By way of a pressure drop between the first and second chambers, an adjusting force acting upon a multi-circuit master cylinder is generated for traction control.

11 Claims, 4 Drawing Sheets

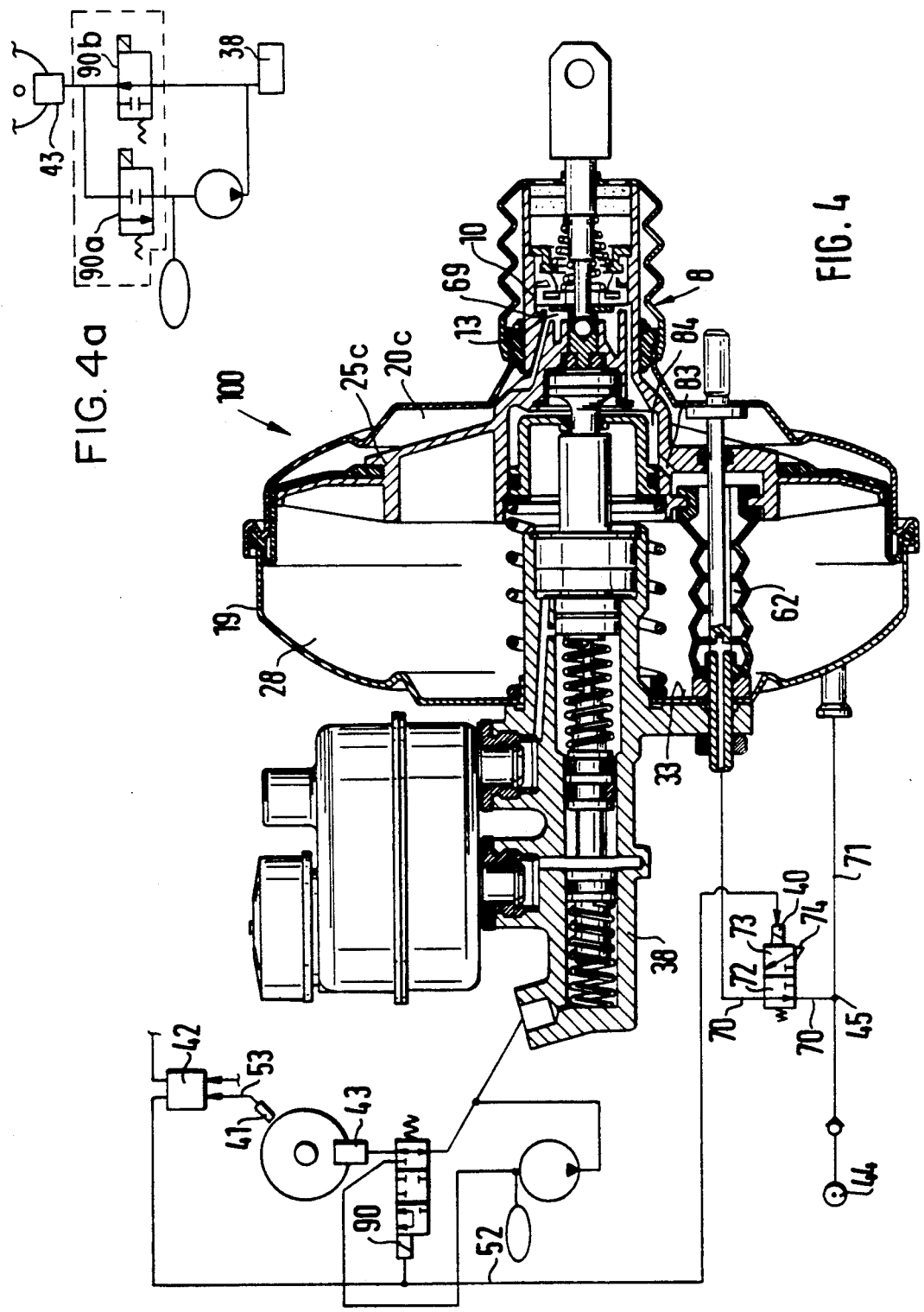

VACUUM MOTOR FOR VEHICLE BRAKE SYSTEMS

This is a continuation of copending application Ser. No. 343,319, filed on Apr. 26, 1989, now abandoned.

BACKGROUND OF THE INVENTION

The invention is based on a vacuum motor as defined hereinafter. A vacuum motor of this kind has been set forth in (German Offenlegungsschrift No. 37 05 333 and European Patent Application 0173054 A2).

In the vacuum motor disclosed in German Offenlegungsschrift No. 37 05 333, a brake force can be built up at wheel brakes independently of the actuation of a control rod connected to the brake pedal, by means of an adjusting device disposed in a movable wall of the vacuum motor and acting upon a control device.

The adjusting device is actuated via a movably disposed line leading through a chamber of constant pressure The line communicates with a valve assembly that can be connected to a pressure source and a negative pressure source by means of control commands gene rated by a manual brake lever and transmitted to a control unit.

In the vacuum motor disclosed in European Patent application, a brake force can be built up independently of the actuation of the control rod connected to the brake pedal, by means of an elastic cylinder chamber that leads through a chamber of constant pressure and can be switched into a connection between a chamber of variable pressure and a valve asembly that is equipped with connections to a pressure source and to a negative pressure source. The valve assembly is controllable by commands of a control unit and is connected to a pressure source and a negative pressure source; the control unit processes sensor-measured values for the distance between two vehicles.

In the above set forth vacuum motors, only some of the possibilities for the use of the vacuum motor that is triggerable independently of the brake pedal have been disclosed.

OBJECT AND SUMMARY OF THE INVENTION

The vacuum motor according to the invention has an advantage over any known prior art in that it is simple in design and that it is used in brake systems that can be combined with both traction control systems and systems having both anti-lock and traction control.

A particularly advantageous feature is the disposition of a third chamber adjoining the two chambers of the prior art toward the control rod; this third chamber establishes a simple connection of the first chamber with a pressure source and a negative pressure source via a reversible valve assembly.

Other provisions of the invention enable a particularly simple embodiment of a transfer line in the movable wall, by means of which line one valve assembly, connected to a pressure source and a negative pressure source, and the first chamber are made to communicate. An advantage of all the characteristics of the invention is that to effect traction control in accordance with the invention, only relatively slight changes in otherwise conventional pneumatic vacuum motors available on the market are necessary.

The invention will be better understood and further objects and advantages thereof will become more apparent from the ensuing detailed description of preferred embodiments taken in conjunction with the drawings.

BRIEF DESCRIPTION OF THE DRAWINGS

FIGS. 1–4 show four different exemplary embodiments of a vacuum motor according to the invention for brake systems including pumps and control valves; and FIG. 4a illustrates a control circuit including a combination of 2/2-way valves which could be substituted for valve 90 in FIG. 4.

DESCRIPTION OF THE PREFERRED EMBODIMENTS

Figure 1:
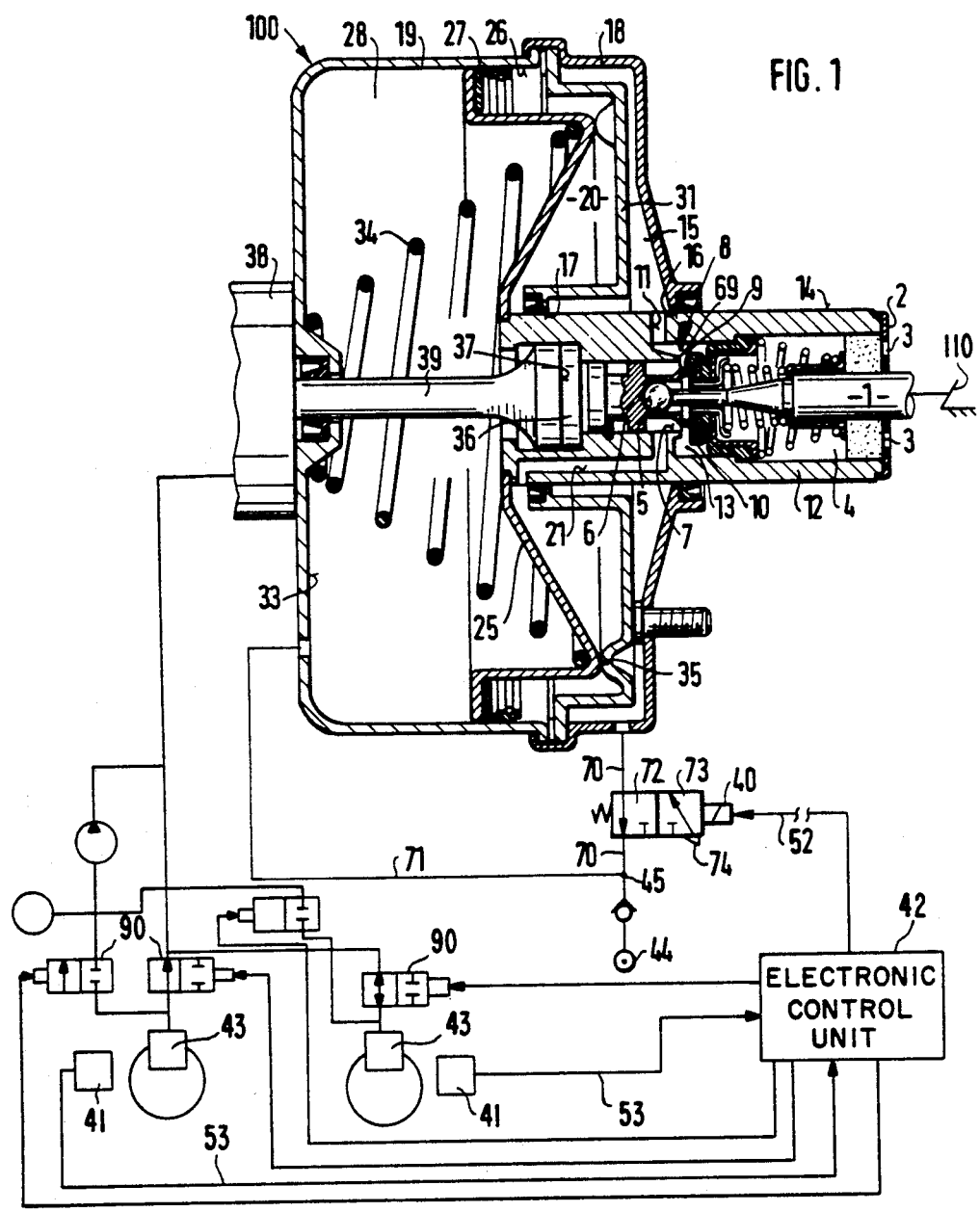

In the exemplary embodiment of FIG. 1, a vacuum motor 100 for vehicle brake systems has a control rod 1, actuatable by a brake pedal 110 and reaching through an inlet side 2 of a receiving piston 12 of the vacuum motor 100. The housing of the vacuum motor is formed by a cup-shaped bottom part 19 and a cap part 18 connected to one another. The receiving piston 12 passes through a wall of the cap part 18 in a first housing bore 16, in which it is movably supported and sealed against leakage by any suitable seal means. Inlets 3 for atmospheric pressure are provided on the inlet side 2 of the receiving piston 12. The control rod 1 is extended in the actuation direction through a control chamber 4, embodied in the receiving piston 12 adjoining the inlet side 2 and communicating with the atmosphere. The control rod is supported by a ball 5 of a control piston 6, which adjoins the rod 1 and is in alignment with the rod to form a control device 8 which is guided in the actuation direction in a slide bore 7 of the receiving piston 12. In the position shown, an annular bead 9 facing toward the inlet side 2 forms a seal with a valve element 10 which opposes the bead 9 from the inlet side 2. The valve element 10 is disposed such that it is displaceable in the control chamber 4 counter to a spring force. The control piston 6 interrupts a hydraulic connection between the atmospheric pressure in the control chamber room 4 and a third chamber 15, which surrounds a cylinder jacket 14 of the recieving piston 12 and is enclosed by the wall of the cap part 18 and a partition 31 that is bent at an angle and fastened firmly at the outer circumference of the third chamber, between the bottom part 19 and the cap part 18. This partition 31, together with the cap part 18, defines the third chamber 15 in the axial direction; in its middle, the partition 31 has a second housing bore 17, in which the receiving piston 12 is guided in a sealed manner by any suitable seal means. The third chamber 15 thus extends radially as far as an inner jacket of the cap part 18. Upon actuation of the vacuum motor 100, a longitudinal portion of the receiving piston 12 that extends from the inlet side 2 as far as the first housing bore 16 is movable into the third chamber 15. A valve chamber 13 in the receiving piston 12, into which the control piston 6 and the sealing bead 9 and valve element 10 protrude, communicates with the third chamber 15 via a radial passage 11 in the receiving piston 12. The partition 31 divides the third chamber 15 from a first chamber 20, which is defined, remote from the third chamber 15, by a movable wall 25. The movable wall 25 is slidably supported on an inner surface 26 of the bottom part 19 and separates the first chamber 20 from a second chamber 28 embodied in the bottom part 19. A conduit 21 embodied in the receiving piston 12 is open toward the first chamber 20 and toward the slide bore 7, so that via the valve chamber 13 and the passage 11, a pressure equilibrium with the third chamber 15 exists as long as the valve element 10 does not come to rest on a fixed valve seat 69 of the control device 8. Remote from the inlet side 2, the receiving piston 12 is firmly joined to the middle portion of movable wall 25. A sealing element 27 on the circumference of the movable wall 25 rests on the inner surface 26 of the bottom part 19 and assures sealing between the first chamber 20 and the second chamber 28. A compression spring 34 disposed between an end wall 33 of the bottom part 19 and the movable wall 25 urges the movable wall 25 toward a stop 35 provided on the partition 31. The movable wall 25 is set into motion together with the control rod 1 for instance upon an actuation of the control rod 1. This motion is transmitted to a transfer element 36, which is disposed in the center of the receiving piston 12 and adjoins the control piston 6 in the actuation direction; the transfer element 36 communicates with a pressure face 37 of a pressure rod 39 which extends through the second chamber 28 to a multi-circuit master cylinder 38.

The third chamber 15 communicates via a line segment 70 with a negative pressure source 44 via a 3/2 way electrically triggerable control valve assembly 40. In a first valve position 72, the control valve assembly opens the communication between the negative pressure source 44 and the third chamber 15. From the line segment 70, a line segment 71 to the second chamber 28 branches off at a connection 45 between the valve assembly 40 and the negative pressure source 44. By means of a control line 52 (see FIG. 4), the electrically triggerable valve assembly 40 is electrically connected to an electronic control unit 42, which receives signals of at least one wheel-mounted sensor 41 of known design. The sensor 41 is connected to the control unit 42 by a signal line 53 (see FIG. 4).

Figure 2:
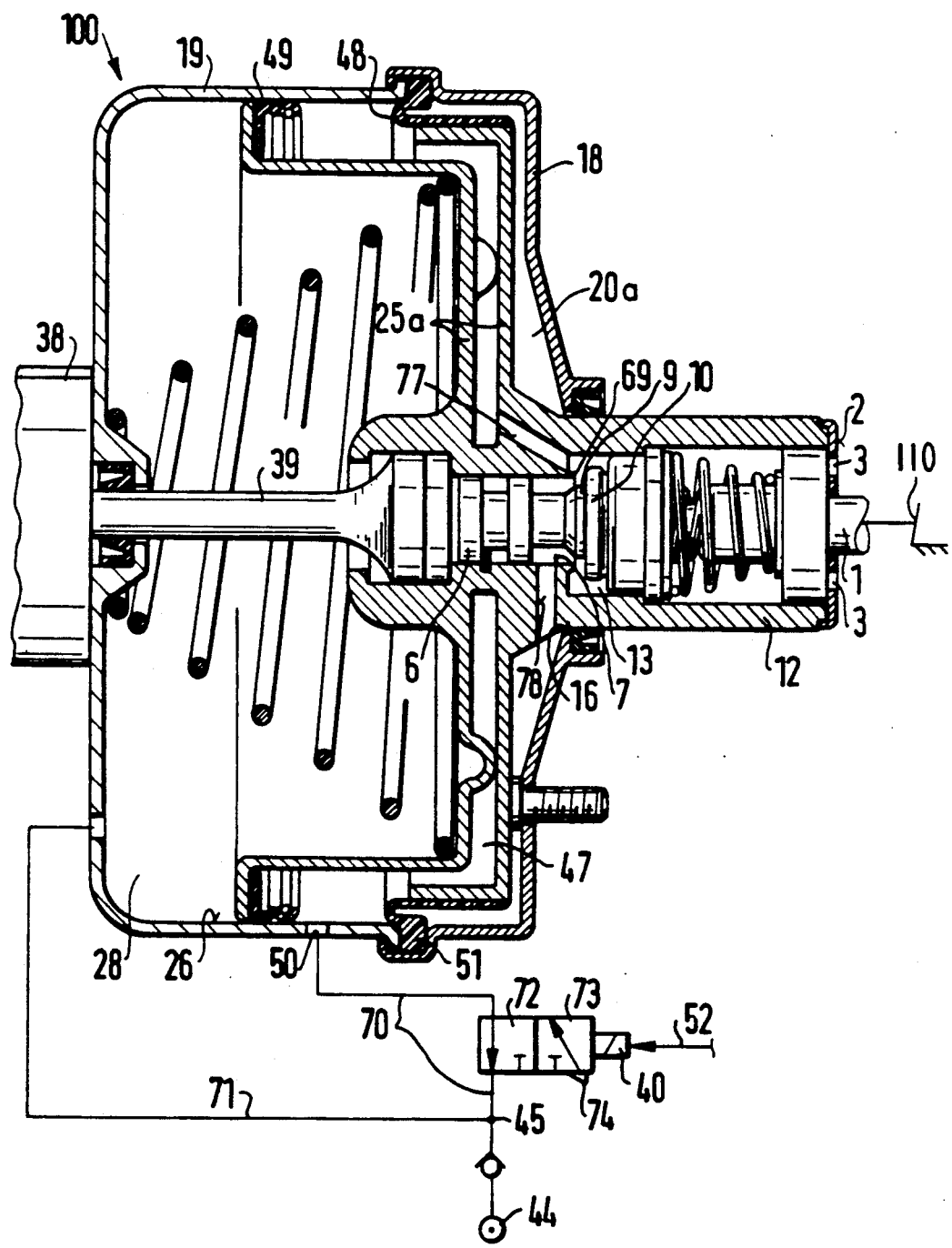

In the exemplary embodiment of FIG. 2, the same reference numerals as in FIG. 1 identify elements that are the same and function the same. In the exemplary embodiment of FIG. 2, the valve chamber 13 communicates via the valve seat 69, the slide bore 7 and a conduit 78 in the receiving piston 12 with the first chamber 20a, which is enclosed between the movable walls 25a and the cap part 18. Embodied in the movable walls 25a is a transfer line 47, which communicates with the valve chamber 13 via a conduit 77 in the piston 12 and with the line segment 70 via a connection 50 in the bottom part 19. The transfer line 47, in the exemplary embodiment shown, is sealed off with a first sealing element 48 oriented toward the first chamber 20a and with a second sealing element 49 oriented toward the second chamber 28, and during the actuation of the vacuum motor 100 it maintains a virtually constant volume.

The embodiment of the sealing element 48 as a diaphragm assures that upon an adjusting movement of the movable walls 25a executed in the axial direction, the connection 50 of a line segment 70 will be located as close as possible to a retaining means 51 of the diaphragm.

Figure 3:
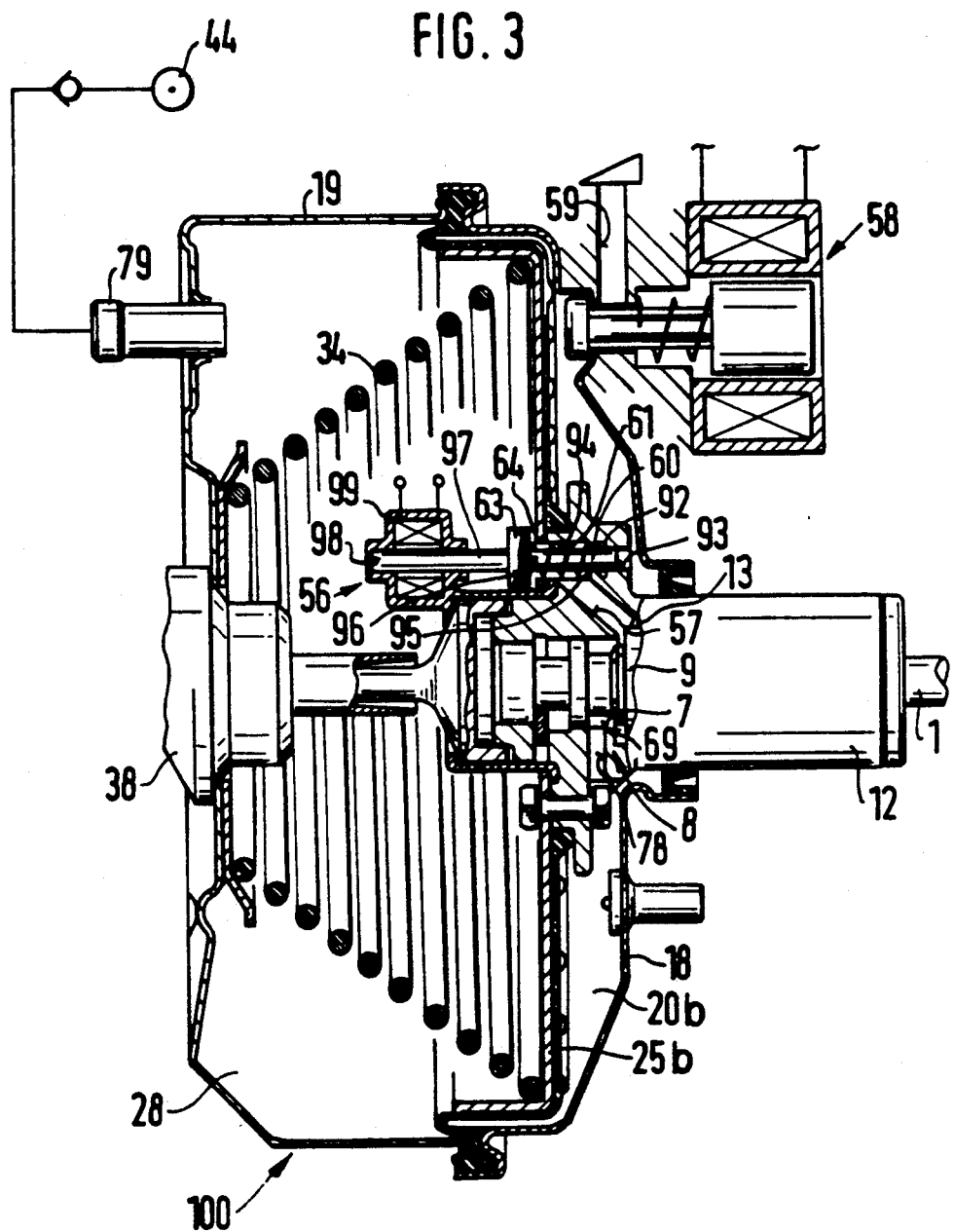

In the exemplary embodiment of FIG. 3, identical reference numerals are used for elements that are the same and function the same as those of the exemplary embodiments of FIGS. 1 and 2.

In FIG. 3, a connecting line 57 is provided that leads from the second chamber 28 to the valve chamber 13 and is controllable by an electromagnetically actuatable first valve 56. A connection from the valve chamber 13 to the first chamber 20b is provided, leading through the valve seat 69 and via part of the slide bore 7 and on through the conduit 78. A pressure line 59 communicating with the atmosphere is either connected to or disconnected from the first chamber 20b by a second electromagnetically triggerable valve 58.

In the event of traction control, a valve closing element 63 of the first valve rests tightly against a valve seat 64 on the movable wall 25b. This excites the first valve 56, which acts counter to a compression spring 61.

In braking and anti-lock control, the first valve 56 and the second valve 58, in the outset position shown, remain unexcited. The second chamber 28 communicates with the valve chamber 13 through the connecting line 57, bypassing the valve closing element 63 and the valve seat 64. By the contact of the sealing bead 9 with the valve seat 69 and by a seal 92 of a valve tappet 60 connected to the valve closing element 63 in the direction of the first chamber 20b, the valve chamber 13 is disconnected from the first chamber 20b. The valve tappet 60 is supported axially movably in a guide bore 93 of the receiving piston 12, the guide bore 93 being aligned with the valve closing element 63.

With a step 95, a bore 94 of larger diameter that is also embodied in the receiving piston 12 adjoins the guide bore 93 toward the valve seat 64. The compression spring 61 is disposed between the step 95 of the bore 94 and an inner contact face 96 embodied with an undercut with respect to the sealing jacket of the valve closing element 63; in the exemplary embodiment of FIG. 3, the compression spring 61 moves the valve closing spring 63 into a position that creates a passage between the second chamber 28 and the valve chamber 13. The valve closing element 63 is connected to a tappet 97 acting as an armature of the first valve 56; the compression spring 61 for instance keeps the tappet 97 in contact with an end face 98 of a valve housing 99 as long as the first valve 56 is not excited.

In the exemplary embodiment of FIG. 4, the same reference numerals again identify elements that are the same and function the same as those of the foregoing embodiments. In FIG. 4, a line segment 62 disposed between the movable wall 25c and the opposed end wall 33 of the bottom part 19 is embodied such that its length, penetrating the second chamber 28, is variable during an adjusting stroke of the movable wall 25c. It is advantageous to use an elastic material for the line segment 62, which is preferably embodied as a bellows; with the same manner of functioning, it can also be disposed in the center of the second chamber 28. The line segment 62 communicates via the line segment 70 with the valve assembly 40 and on the other end leads via passages 83, 84 to the control device 8. The second chamber 28 always communicates with the negative pressure source 44.

On braking, the mode of operation of the conventional brake system remains unaffected by the particular embodiment of the vacuum motor 100 intended for traction control.

If a certain brake pressure is to be built up by the brake pedal in the exemplary embodiment of FIG. 1, the control rod 1 is moved toward the control piston 6 and in so doing carries the valve element 10, pressed against the control piston 9, with it as far as the valve seat 69 of the control device 8 on which the valve element 10 is sealed. Once the valve element 10 is seated on the valve seat 69, a connection is opened that allows atmospheric pressure to flow out of the control chamber 4 via the chamber 13 and conduit 11 into the third chamber 15.

The third chamber 15 remains connected to the negative pressure source 44, via the line segment 70 through the valve assembly 40, while the second chamber 28, via the line segment 71, likewise communicates with the negative pressure source 44. By the pressure change existing between the third chamber 15 and the second chamber 28 and a resultant adjusting force, the movable wall 25 and control device 8 are moved toward the second chamber 28, and via the pressure rod 39 that is moved in coupled manner with them, an adjusting force can be transmitted for the purpose of pressure generation to a piston disposed in the multicircuit master cylinder 38. By means of a continuous motion of the brake pedal in the pressure buildup direction, the control rod 1 and the entrained control piston 6 will further separate the sealing bead 9 from the valve element 10; this increases the adjusting force. The control piston 6 will then be connected to the transfer element 36, and will accept a certain proportion of the adjusting force in the actuation direction.

When the brake pedal is not applied, and if one of the wheels, upon starting, leaves its state that promotes driving (spinning), this status is detected in a known manner by at least one sensor 41 and is passed on by a signal of the electronic control unit 42 to the valve assembly 40 (see FIG. 4). Upon being triggered, the valve assembly 40 is switched into a second valve position 73 and thus allows atmospheric pressure to flow via a connection 74 into the line segment 70 and the third chamber 15, and this pressure becomes operative in the first chamber 20 via the passage 11, chamber 13 and the conduit 21. The second chamber 28 remains in communication with the negative pressure source 44. By means cf the pressure change produced between the first chamber 20 and the second chamber 28 and the resultant adjusting force, the movable wall 25 and the control device 8 are moved toward the multi-circuit master cylinder 38 and thus, with the adjusting force of the vacuum motor 100 put out by the pressure rod 39, can effect a hydraulic pressure in the multi-circuit master cylinder 38. The hydraulic pressure of the multi-circuit master cylinder 38 can be directed in a known manner to electromagnetically actuated valve assemblies 90 of a known anti-lock control system, which is triggered by traction control signals from the electronic control unit 42 and thus causes this pressure to be operative in at least one wheel brake cylinder 43 for braking the driven wheels if they are spinning. Once the traction control state ends, the valve assembly 40 is returned to the first valve position 72, and the first chamber 20 and the third chamber 15 are moved into communication with the second chamber 28 and hence with the negative pressure source 44. The movable wall 25 can thus be returned to its outset position against the stop 35 by the compression spring 34, which is embodied with a prestressing force.

In FIG. 2, an arrangement is shown in which in the event of traction control, via the transfer line 47 relative to the movable walls 25a and by means of the conduits 77, 78, the valve chamber 13 and the slide bore 7, the first chamber 20a is made to communicate with the atmospheric pressure, by means of the excited valve assembly 40, which is in the second valve position 73. The second chamber 28 communicates with the negative pressure source 44, resulting in a pressure change, between the first chamber 20a and the second chamber 28, for actuating the multi-circuit master cylinder 38. The the second chamber 28 communicates with the negative pressure source 44 via a connection 79.

FIG. 3 shows an arrangement in which in the traction control situation, the second valve 58 and the first valve 56 are excited simultaneously, and the connecting line 57 is closed by the first valve 56. By means of the valve 58 that is then open to the pressure line 59, atmospheric pressure prevails in the first chamber 20b, and a certain adjusting force is built up in the direction of the multi-circuit master cylinder 38. The second chamber 28 communicates, with connection 79, with the negative pressure source 44.

Once this process that serves to drive the vehicle is concluded, the connecting line 57 is opened by de-excitation of the first valve 56, and the pressure line 59 to the first chamber 20b is closed by de-excitation of the second valve 58. After that, the movable wall 25 is returned to its outset position by the compression spring 34.

In FIG. 4, an arrangement is shown in which in the case of traction control the valve assembly 40 is movable into the second valve position 73, as a result of which atmospheric pressure can be built up in the first chamber 20c. As shown, the atmospheric pressure can be carried through the line segment 62, which leads through the second chamber 28 and is sealed off from it elastically, to the passages 83, 84 disposed in the movable wall 25c, and from there past the opened valve assembly between the valve element 10 and the valve seat 69 to the first chamber 20c. The second chamber 28 has a connection to the negative pressure source 44 only via the line segment 71. The movable wall 25c is thus movable in the known manner by an adjusting force in the direction of the multi-circuit master cylinder 38.

The foregoing relates to preferred exemplary embodiments of the invention, it being understood that other variants and embodiments thereof are possible within the spirit and scope of the ivention, the latter being defined by the appended claims.

What is claimed and desired to be secured by Letters Patent of the United States is:

1. A vacuum motor for brake systems in vehicles including wheels which are each assigned a wheel brake cylinder that communicates via a brake line with a multi-circuit master cylinder, which comprises a housing, said housing including a bottom part (19) and a cap part (18), at least a second chamber (28) and a first chamber 20, 20a, 20b, 20c) in said housing, a movable wall (25) that separates said housing into said at least first and second chambers, a receiving piston (12) operative in said housing and affixed to said movable wall, said receiving piston including a brake boost control device (8) therein, a multi-circuit master cylinder secured to said housing for operation by said brake boost control device, a control rod (1) actuatable by a brake pedal and acting upon said brake boost control device, said control rod and said control device being operative to control a pressure difference between said at least two chambers located in said housing and separated by said movable wall, at least one electromagnetic valve assembly which is in direct communication to ambient air and controls fluid flow that acts upon said movable wall, an electronic control unit (42) which triggers said at least one electromagnetic valve assembly for controlling communication to said ambient air which is a pressure source and a negative pressure source which effects a pressure change in one of said at least first and second chambers, by means of which pressure change an adjusting force toward said multi-circuit master cylinder can be generated in a traction control case independently of said control rod actuatable by the brake pedal, whereby in said traction control case, signals of at least one sensor (41) disposed on the wheels are detected and passed on to the control unit (42), and that as a result, the at least one electromagnetic valve assembly is triggerable in such a way that an adjusting force upon the multi-circuit master cylinder (38) for a traction control of at least one wheel brake cylinder (43) is generated, further the vacuum brake booster, which is acted upon with ambient air via the magnet valve assembly, and the master brake cylinder (38) furnishes only a supply pressure, which by means of the anti-skid valves (90), the supply pressure is modulated separately for the left and right wheel brakes of the drivable wheels whereby the systems function to control an anti-skid operation and an anti-spin operation.

2. A vacuum motor for brake systems as defined by claim 1, in which said valve assembly (40) connects the line segment (62) with the atmosphere during traction control.

3. A vacuum motor for brake systems as claimed in claim 1, in which said at least one electromagnetic valve assembly includes an inlet (74) that communicates with ambient atmosphere pressure source which is controlled by said at least one electromagnetic valve assembly to apply atmospheric pressure to said movable inflexible wall (25).

4. A vacuum motor for brake systems as defined by claim 1, in which a transfer line (47) is provided in the movable wall (25), which transfer line, at least in the traction control case, communicates with at least one of said first and second chambers (20, 28) and is connectable by means of said at least one electromagnetic valve assembly (40) to a negative pressure source (44).

5. A vacuum motor for brake systems as defined by claim 4, in which said transfer line (47) provided in the movable wall (25) maintains a virtually constant volume during an actuation of the vacuum motor (100).

6. A vacuum motor for brake systems as defined by claim 1, in which said at least one electromagnetic valve assembly is embodied by an elecromagnetically actuatable first valve (56) and an electromagnetically actuatable second valve (58), and a connecting line (57) that leads to a valve chamber (13) from a second chamber (28) that communicates with a negative pressure source (44) which is controllable by an electromagnetically actuatable first valve (56), and a second electromagnetically actuatable valve (58) that controls a pressure line (69) from the atmosphere which serves as a pressure source to the first chamber (20).

7. A vacuum motor for brake systems as defined by claim 6, in which upon excitation said second electromagnetically actuatable valve (58), opens up the communication between the atmosphere and the first chamber (20), and said first electromagnetically actuated valve (56) is closed, and upon a de-excitation of said second electromagnetically actuated valve (58), said first elecromagnetically activated valve (56) closes this communication between the atmosphere and the first chamber (20), and said first electromagnetically activated valve (56) is opened.

8. A vacuum motor for brake systems as defined by claim 1, in which said valve assembly (40) that is connectable to atmospheric pressure and to the negative pressure source (44) communicates with a line segment (62) that is embodied between said movable wall (25) and said bottom part (19) of the housing and is open to the control device (8), and the line segment (62) is variable in its length during an adjusting stroke of said movable wall (25).

9. A vacuum motor for brake systems in vehicles including wheels which are each assigned a wheel brake cylinder that communicates via a brake line with a multi-circuit master cylinder, which comprises a housing, said housing including a bottom part (19) and a cap part (18), at least a second chamber (18) and a first chamber (20, 20a, 20b, 20c) in said housing, a movable wall (25) that separates said housing into said at least first and second chambers, a receiving piston (12) operative in said housing and affixed to said movable wall, said receiving piston including a brake boost control device (8) therein, a multi-circuit master cylinder secured to said housing for operation by said brake boost control device, a control rod (1) actuatable by a brake pedal and acting upon said brake boost control device, said control rod and said control device being operative to control a pressure difference between said at least two chambers located in said housing and separated by said movable wall, at least one electromagnetic valve assembly which is in direct communication to ambient air and controls fluid flow that acts upon said movable wall, an electronic control unit (42) which triggers said at least one electromagnetic valve assembly for controlling communication to said ambient air which is a pressure source and a negative pressure source which effects a pressure change in one of said at least first and second chambers, by means of which pressure change an adjusting force toward said multi-circuit master cylinder can be generated in a traction control case independently of said control rod actuatable by the brake pedal, whereby in said traction control case, signals of at least one sensor (41) disposed on the wheels are detected and passed on to the control unit (42), and that as a result, the at least one electromagnetic valve assembly is triggerable in such a way that an adjusting force upon the multi-circuit master cylinder (38) for a traction control of at least one wheel brake cylinder (43) is generated, a third chamber (15) which is a toroidal connection chamber between non-movable walls and surrounding said receiving piston and adjoining said first and second chambers (20, 28) in a direction of the control rod (1), said third chamber communicates at least in a traction control case, with one of said first and second chambers (20, 28), and said third chamber (15) for pressure buildup is connectable by said at least one electromagnetic valve assembly directly to ambient air which operates as a pressure source.

10. A vacuum motor for brake systems as defined by claim 9 said receiving piston (12) includes at least one passage (11) communicating said third chamber (15) to a sealing bead (9) of said brake boost control device (8) which communicates to a conduit (21) opening into one of said first and second chambers.

11. A vacuum motor for brake systems as defined by claim 9, in which said third chamber (15) extends radially as far as an inner jacket of said cap part (18) of the housing.